United States Patent
Tsuei et al.

(10) Patent No.: US 8,386,672 B2
(45) Date of Patent: Feb. 26, 2013

(54) SYSTEMS, METHODS AND MEDIA FOR DISABLING GRAPHIC PROCESSING UNITS

(75) Inventors: En-Lin Allen Tsuei, Austin, TX (US); Matthew Page, Round Rock, TX (US); Orlando Rigueira, Georgetown, TX (US); Nathan Vecera, Lexington, TX (US)

(73) Assignee: Dell Products L.P., Round Rock, TX (US)

( * ) Notice: Subject to any disclaimer, the term of this patent is extended or adjusted under 35 U.S.C. 154(b) by 1267 days.

(21) Appl. No.: 12/169,626

(22) Filed: Jul. 8, 2008

(65) Prior Publication Data

US 2010/0007646 A1   Jan. 14, 2010

(51) Int. Cl.
*G06F 13/12* (2006.01)
*G06F 13/38* (2006.01)
*G06F 9/00* (2006.01)
*G06F 9/24* (2006.01)
*G06F 15/177* (2006.01)
*G06F 1/24* (2006.01)
*G06F 1/00* (2006.01)
*G06F 1/26* (2006.01)
*G06F 1/32* (2006.01)

(52) U.S. Cl. ......... 710/62; 713/1; 713/2; 713/100; 713/300; 713/320; 713/324

(58) Field of Classification Search ............ None
See application file for complete search history.

(56) References Cited

U.S. PATENT DOCUMENTS

| | | | |
|---|---|---|---|
| 6,292,890 B1* | 9/2001 | Crisan | 713/2 |
| 6,356,965 B1* | 3/2002 | Broyles et al. | 710/104 |
| 7,131,011 B2* | 10/2006 | Westerinen et al. | 713/300 |
| 7,590,877 B2* | 9/2009 | Kim et al. | 713/323 |
| 7,721,118 B1* | 5/2010 | Tamasi et al. | 713/300 |
| 7,886,164 B1* | 2/2011 | Alben et al. | 713/300 |
| 2005/0163493 A1 | 7/2005 | Kobayashi et al. | |
| 2008/0030509 A1 | 2/2008 | Conroy et al. | |
| 2008/0034238 A1 | 2/2008 | Hendry et al. | |
| 2008/0082752 A1* | 4/2008 | Chary et al. | 711/118 |
| 2008/0168285 A1* | 7/2008 | de Cesare et al. | 713/320 |
| 2008/0244289 A1* | 10/2008 | LeProwse et al. | 713/320 |

* cited by examiner

*Primary Examiner* — Kris Rhu
(74) *Attorney, Agent, or Firm* — Baker Botts L.L.P.

(57) ABSTRACT

An information handling system (IHS) provides a method for managing power consumption. The method includes detecting a power-on in the IHS, wherein the IHS comprises a first graphics processing unit (GPU) and at least one additional GPU. The method also includes determining if a normal boot is implemented in the IHS and determining if an instant-on boot occurred if the normal boot is implemented. The at least one additional GPU is disabled if an instant-on boot occurred.

17 Claims, 4 Drawing Sheets

SYSTEMS, METHODS AND MEDIA FOR DISABLING GRAPHIC PROCESSING UNITS

BACKGROUND

1. Technical Field

The present disclosure relates generally to the field of information handling systems. More specifically, but with limitation, the disclosure relates to multi-core graphics processing.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An IHS may be provided in a portable housing that may allow the IHS to be easily transported, herein referred to as a portable IHS. A portable IHS may utilize a battery pack containing multiple rechargeable battery cells. A battery pack may provide a temporary power source to the portable IHS when a continuous power source (e.g., AC power outlet and AC adapter) is not available. However, battery life in portable IHSs may often be a concern when operating on power provided by a battery pack.

Within a portable IHS, a multi-core graphics solution may increase graphics processing ability. A multi-core graphics solution, such as Nvidia scalable link interface (SLI) and ATI CrossFire, may utilize two or more graphics processing units (GPUs) or video cards to process graphics data and provide high quality graphics. Power consumption may increase for a portable IHS with additional GPUs. Due to the increase in power consumption, it may be difficult to utilize a multi-core graphics solution in a portable IHS utilizing battery power. Some portable IHSs may provide other special modes of operation, such as a low power mode, that are not intended to run high intensive 3D type of applications and require less power.

Thus, a need exists for methods, apparatus, and media for disabling GPUs in an IHS utilizing multiple GPUs to reduce power consumption.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for managing power consumption in an information handling system (IHS). The method includes detecting a power-on in the IHS, wherein the IHS comprises a first graphics processing unit (GPU) and at least one additional GPU. The method also includes determining if a normal boot is implemented in the IHS and determining if an instant-on boot occurred if the normal boot is implemented. At least one additional GPU is disabled if an instant-on boot occurred.

Another aspect of the disclosure provides an information handling system (IHS) including a first graphics processing unit (GPU) and at least one additional GPU, wherein the at least one additional GPU is coupled to the first GPU by a switch, and the first GPU and the at least one additional GPU are coupled to a graphic connector through a bridge. The IHS also includes a memory operable to store firmware, wherein the firmware detects whether a power-on occurs in the IHS, and a controller coupled to the memory, wherein the controller is configured to disable the at least one additional GPU in the event the power-on occurs and an instant-on boot occurs.

Yet another aspect of the disclosure provides a computer-readable medium having computer-executable instructions for reducing power consumption in an information handling system (IHS). The method includes detecting a power-on in the IHS, wherein the IHS comprises a first graphics processing unit (GPU) and at least one additional GPU. The method also includes determining if a normal boot is implemented in the IHS and determining if an instant-on boot occurred if the normal boot is implemented. The at least one additional GPU is disabled if an instant-on boot occurred.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus, media, and methods are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a unit" refers to one or several units, and reference to "a method for managing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
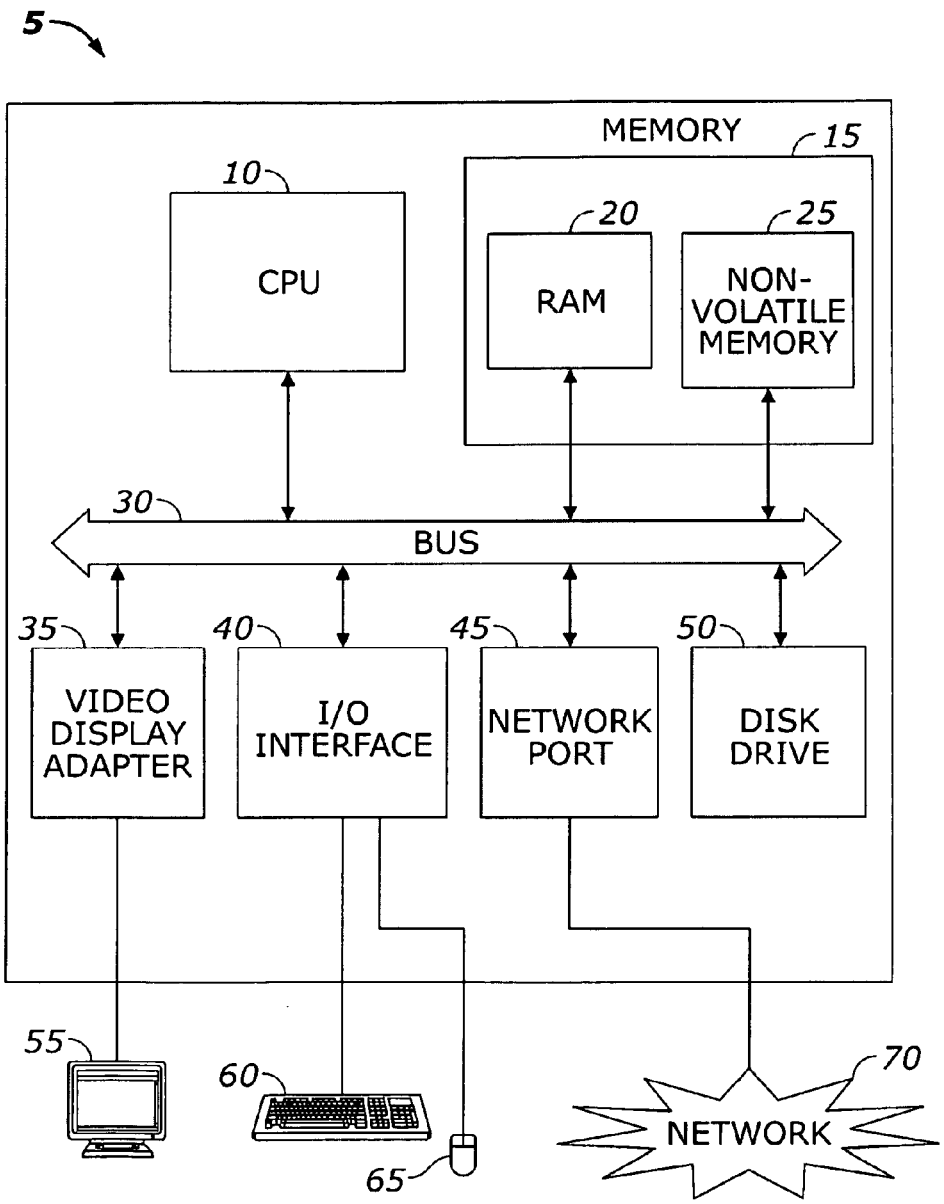
FIG. 1 represents an illustrative schematic of an information handling system (IHS) in accordance with one implementation of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory 28, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
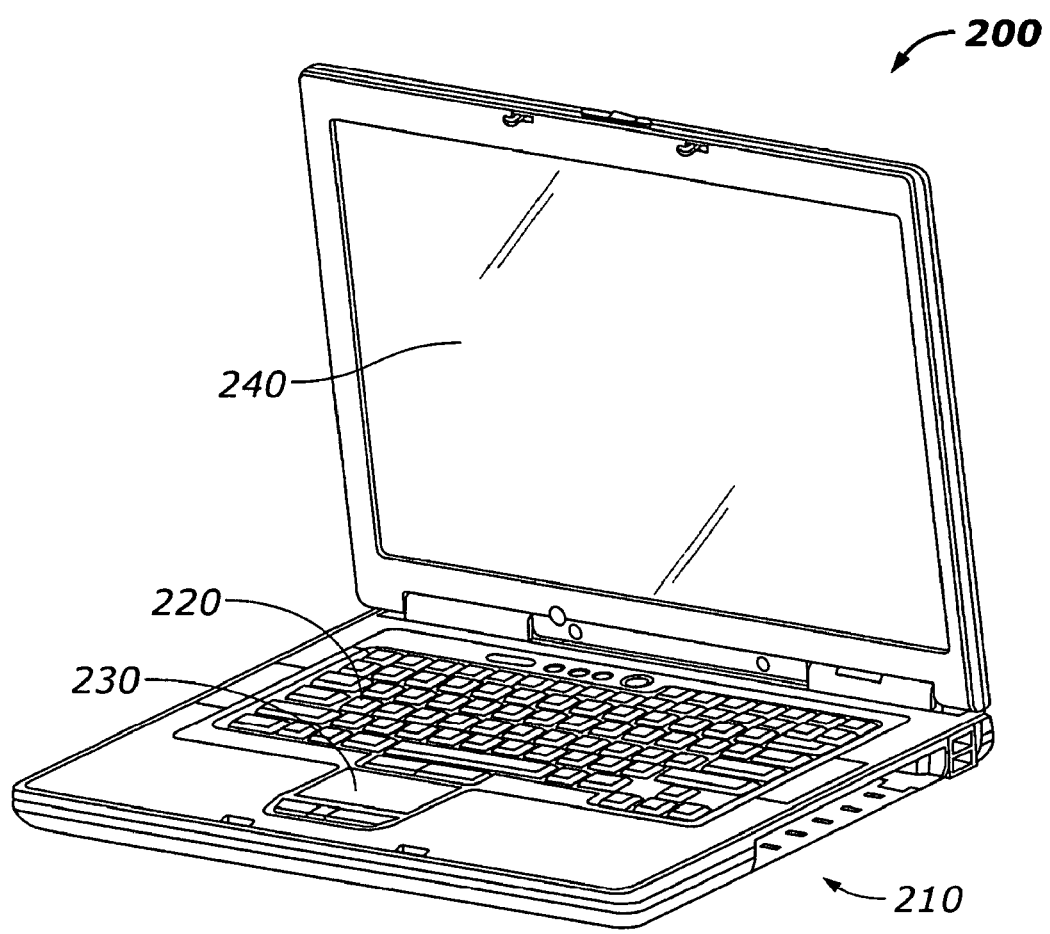
FIG. 2 provides an illustrative implementation of a portable IHS.

FIG. 2 provides an illustrative implementation of a portable IHS indicated generally at 200. The portable IHS 200 may provide a base housing 210 and a display housing 220. A display housing 220 may include a flat panel display, such as a liquid crystal display (LCD), which may be coupled to components in a base housing 210. A base housing 210 may provide several of the components present in an IHS (e.g., FIG. 1). By way of example and not limitation, a base housing 210 may include a CPU, memory, a video display adapter, I/O interfaces, a network port, and a disk drive. A portable IHS 200 may also provide several buttons 230, such as a power button, a special IHS mode button, several display adjustment buttons, and any other suitable buttons.

Additionally, a portable IHS 200 may include an AC adapter and a battery pack (not shown). An AC adapter may plug into an alternating current (AC) power outlet to power the components of a portable IHS 200 and/or to charge a battery pack. When an AC adapter is not coupled to the portable IHS 200, the components of the portable IHS 200 may be powered by a battery pack. However, a battery pack may provide a temporary power source and should be recharged before the battery pack loses power. The battery life or the amount of temporary power a battery pack may provide may be depend on the number of battery cells provided in the battery pack and the rate of power consumption for a portable IHS. In some implementations of a portable IHS, multiple graphics processing units (GPUs) may be utilized to perform graphics data processing. As a result, the rate of power consumption by a portable IHS may increase, which may significantly reduce the amount of time that the portable IHS can run on a battery power.

In one implementation of an IHS, a multimedia mode may allow the user to perform a limited set of multimedia operations utilizing an instant-on or quick boot function. By way of example and not limitation, a multimedia mode may allow a user to play a movie or music, display a presentation, or transfer data to flash memory without having to wait for the entire operating system (OS) to boot. In a normal boot mode, a user may press a power button on an IHS that may cause an OS to be loaded and hardware in the IHS to be fully initialized. In an instant-on or quick boot mode, a simplified OS may be loaded and a limited set of device drivers may be loaded to allow an IHS to be quickly booted. As a result, not all hardware in the IHS may be initialized and/or an IHS may provide limited functionality. For instance, in a multimedia mode, the simplified OS may be booted and only device drivers needed for multimedia functions may be loaded. Drivers utilized for multimedia functions may include display drivers, audio/video drivers, I/O drivers (e.g., keyboard, mouse, touchpad, etc.), an optical or hard drive driver, and any other suitable drivers. In one implementation, an instant-on or quick boot mode may be initialized by pressing a special IHS mode button 230.

Figure 3:
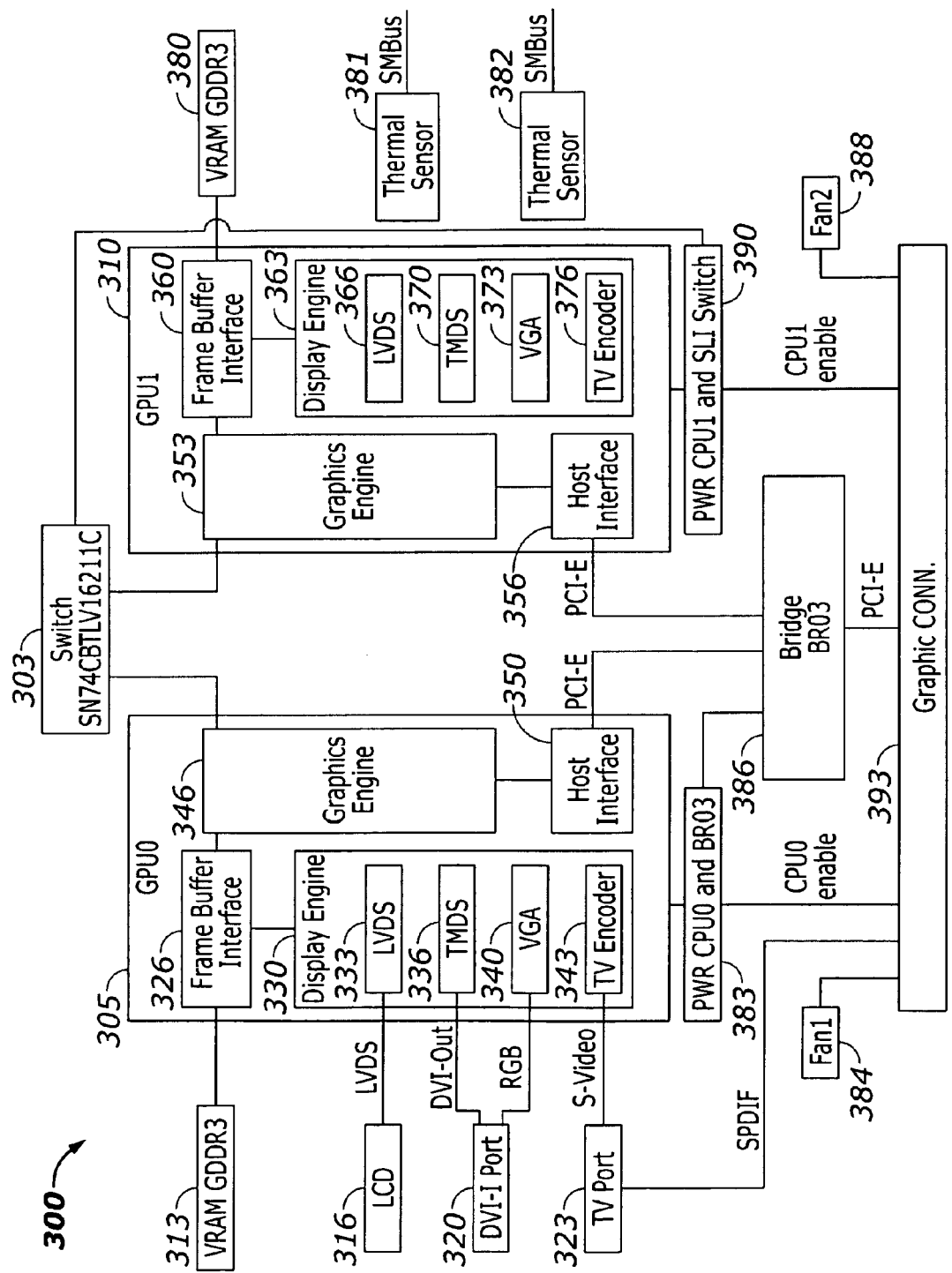
FIG. 3 represents an illustrative implementation of multi-core graphics solution.

FIG. 3 represents an illustrative implementation of multi-core graphics solution. In an IHS, a multi-core graphics solution indicated generally at 300 may be utilized to provide improved graphics processing. A first GPU 305 and a second GPU 310 provide multi-core graphics processing for the IHS. The first GPU 305 and second GPU 310 may be coupled to a graphic connector 393. A graphic connector 393 may provide an interface to a motherboard that allows the GPUs 305 and 310 to communicate with other components of an IHS, such as a processor, memory, power source, peripherals, I/O devices, disk drives, and various components of an IHS. The graphic connector 393 may provide a peripheral component interconnect express (PCI-E or PCIe) interface or any other suitable interface for a GPU. In a multi-core graphics solution 300, a bridge 386 may be utilized to couple the first GPU 305 and the second GPU 310 to the graphic connector 393. The bridge 386 may allow both the first GPU 305 and second GPU 310 to communicate through the graphic connector 393. The graphic connector 393 may also be coupled to a first power regulator 383 and a second power regulator 390, which may allow the first GPU 305 and second GPU 310 to be enabled or disabled. A first power regulator 383 may provide power to the first GPU 305 and the bridge 386, while a second power regulator 390 may provide power to the second GPU 310 and a switch 303. Fans 384 and 388 may also be coupled to the graphics connector 393 to provide cooling to the GPUs. Thermal sensors 381 and 382, which may measure the temperature of the GPUs, may be coupled to a system management bus (SMBus) to provide temperature data the OS or the like. An IHS may utilize the thermal sensors 381 and 382 to detect the temperature of the GPUs and control fans 384 and 388 to regulate the temperature of the GPUs 305 and 310 accordingly.

In one implementation of a multi-core graphics solution 300, a first GPU 305 and a second GPU 310 may be identical. A host interface 350 may provide an interface between a graphics engine 346 and the bridge 386. The graphics engine 346 may be coupled to a video random access memory (VRAM) 313 through a frame buffer interface 326. The VRAM 313 may comply with a version of graphics double data rate (GDDR), such as GDDR2, GDDR3, GDDR4, or GDDR5. Utilizing the VRAM 313, the graphics engine 346 may perform video and graphics processing for an IHS. Video and graphics processing may involve performing computations related to video and graphics data, such as rendering, texture mapping, geometric calculations, compression, motion compensation, and/or various other types of processing performed on video and graphics data. The frame buffer interface 326 may also couple the graphics engine 346 to a display engine 330, which may convert the processed data into different formats for different types of outputs. For instance, a display engine 330 may provide a low voltage differential signaling (LVDS) 333, transition minimized differential signaling (TMDS) 336, video graphics array (VGA) 340, and TV encoder 343 outputs. Each of the different outputs may provide a signal in a different protocol and may utilize specific types of connectors and cables (e.g., LVDS, DVI-out, RGB, and S-Video). For instance, the first GPU 305 may output a signal to a liquid crystal display (LCD) 316 utilizing a twisted-pair copper cable. The first GPU 305 may also output a signal to a digital visual interface-integrated (DVI-I) port 320 or to a TV port 323 which may also receive a digital audio signal from the graphic connector 393.

A host interface 356 may couple a second GPU 310 to a graphic connector 393 through the bridge 386. The second GPU 310 may include a graphics engine 353, a frame buffer interface 360, and a display engine 363, which provide the same functionality discussed regarding the first GPU 305. However, a LVDS 366, TMDS 370, VGA 373, and TV encoder 376 may not be active or coupled to a display or output ports. When a first power regulator 383 and second power regulator 390 provide power to the first GPU 305, second GPU 310, bridge 386, and switch 303, the GPUs may operate in a multi-core processing mode. In a multi-core processing mode, the first GPU 305 and the second GPU 310 may share graphics processing duties and act as coprocessors. The graphics engine 353 in the second GPU 310 may utilize the VRAM 380 to perform graphics processing, and data may be communicated to the first GPU 305 through the switch 303. Similarly, the first GPU may also be performing graphics processing as well. Graphics data processed by the first GPU 305 and the second GPU 310 may be provided to the display engine 330 for output to a display or an output port.

In a single GPU mode, an IHS may not require the processing power of multiple GPUs, thus allowing power consumption by the multi-core graphics solution 300 to be reduced by disabling one or more GPUs. For instance, a portable IHS may provide a mode in which limited functionality is provided with a short boot time, such as a multimedia mode. A user may select a multimedia mode when a particular multimedia operation is desired, but the user does not want to wait for the IHS to completely boot. In a multimedia mode, the limited functionality provided by an IHS may not require the processing power of multiple GPUs. For instance, a user may want to play music, check email, or view an appointment book without having to wait the entire duration for the IHS to boot. By providing a multimedia mode, a user may utilize an IHS's basic functions without having to wait for the OS to boot, which may sometimes require a significant amount of time.

In the single GPU mode, a second GPU 310 may be disabled or essentially powered down. A multi-core graphics solution 300 may provide separately controlled power regulators 383 and 390 to allow one of the GPUs and other components to be disabled in a single GPU mode. A system embedded controller (EC) (not shown) may receive a control signal to disable a second GPU 310 when a low power mode is desired. An EC may communicate with the BIOS to control various functions in an IHS, such as system power on/off, a keyboard controller, battery charging, thermal/fan control, and various other functions in the IHS. For instance, if the EC determines that the user requested a multimedia mode on system power-up, the control signal may be asserted to disable all but a first GPU 305. A second power regulator 390 may be powered down, which disables a switch 303 and the second GPU 310 including VRAM 380. By disabling the switch 303 between the GPUs 305 and 310, current leakage from the first GPU 305 to the second GPU 310 may be prevented. Further, thermal sensor(s) 382 detecting the temperature of the second GPU 310 may be turned off or ignored and fan(s) 388 cooling the second GPU 310 may be turned off. In one implementation, the clock rate of the first GPU 305 may be increased when the second GPU 310 is powered down to improve graphics processing in a single GPU mode. While increasing the clock rate may increase power consumption in the single GPU mode, the power consumption may still be significantly lower than a multiple GPU processing mode.

Figure 4:
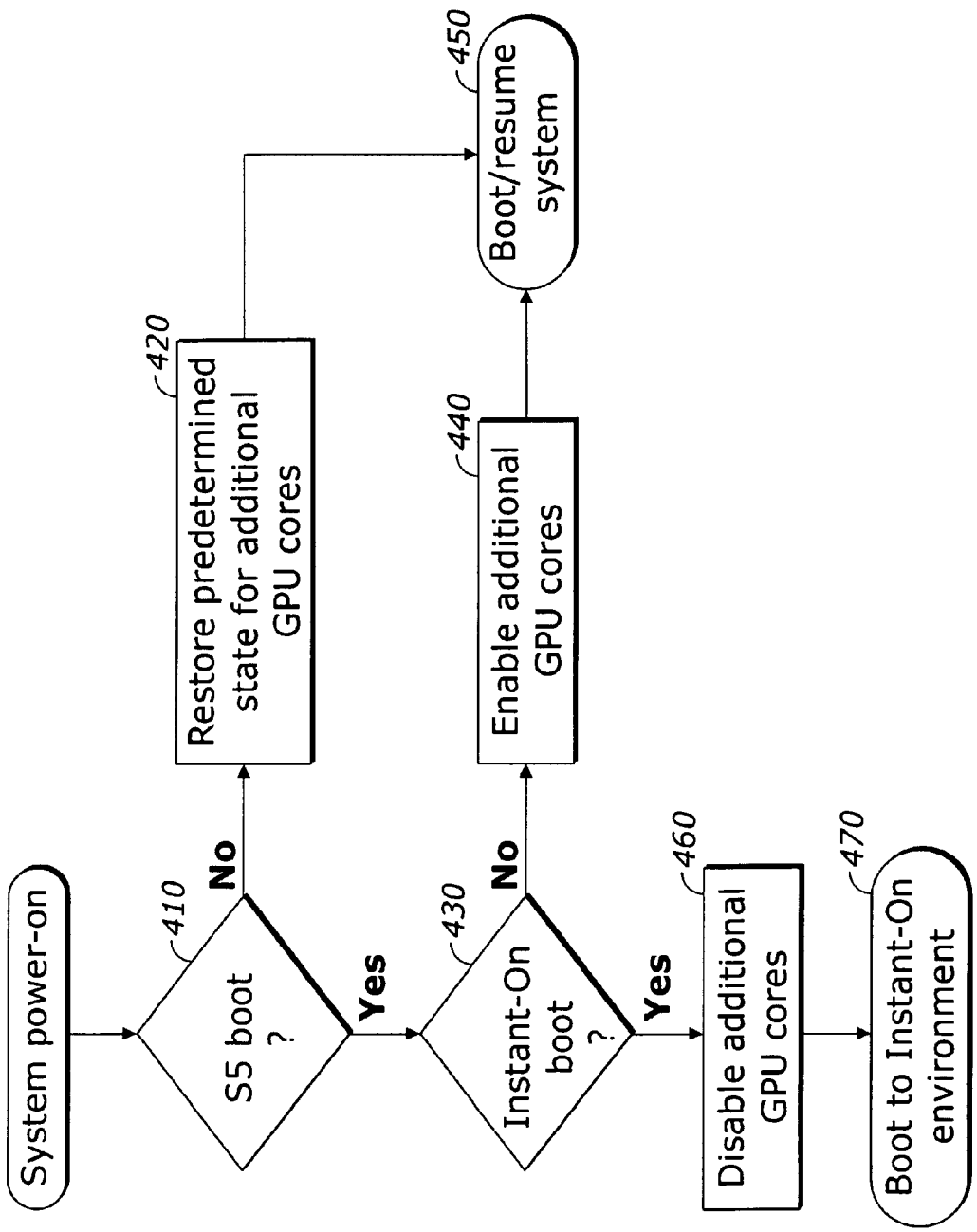
FIG. 4 provides an illustrative flow diagram of a multi-core graphics system booting process.

FIG. 4 provides an illustrative flow diagram of a multi-core graphics system booting process. A user may power or turn on an IHS by pressing a power button or a special mode button. When an IHS is powered on, a boot mode may be detected to determine whether the multi-core graphics solution should enable multiple GPUs or a single GPU. In step 410, a BIOS may determine if a S5 boot has occurred. If a S5 boot is detected, then the BIOS may determine if an instant-on boot has occurred in step 430. If an instant-on boot is detected, the additional GPU cores may be disabled in step 460. Next, the portable IHS may then be booted to an instant-on environment providing limited functionality in step 470. If an instant-on boot is not detected, the additional GPU cores may be enabled in step 440 to allow a normal boot mode. Once the additional GPU cores are enabled, the system may be booted in a normal operating mode in step 450. If a S5 boot has not occurred in step 410, then the BIOS may restore a pre-determined state for additional GPU cores in step 420. Once the pre-determined state of the GPUs is restored, the system may resume normal operation in step 450.

By providing the ability to disable additional GPU cores, a multimedia mode with increased battery life may be achieved by having a single GPU core operating at a higher clock rate. The multi-core graphics solution may provide both single and multi-core operation modes, which provide the flexibility to supply high quality graphics processing or reduced power consumption when desired. While several dual GPU implementations are discussed, the scope of the invention is in no way limited to dual GPU implementation. Similar solutions for any multi-core graphics solution may be implemented for additional GPU cores.

Various methods are contemplated including all or less than all of the steps described herein and/or mentioned above, any number of repeats or any of the steps shown and/or mentioned above, and performance of the steps in any order.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing power consumption in an information handling system (IHS), the method comprising:
    detecting a power-on in the IHS, wherein the IHS comprises a first graphics processing unit (GPU) and at least one additional GPU;
    determining if a normal boot is implemented in the IHS;
    determining if an instant-on boot occurred; and
    disabling the at least one additional GPU if an instant-on boot occurred;
    wherein the IHS further comprises a switch coupling the first GPU to the at least one additional GPU, the switch being powered down if the instant-on boot occurred.

2. The method of claim 1, wherein the IHS restores the at least one additional GPU to a pre-determined state if the normal boot is not implemented, wherein the pre-determined state is a state of the first GPU and the at least one additional GPU saved prior to the power-on.

3. The method of claim 1, wherein the first GPU and the at least one additional GPU are enabled if the normal boot is implemented and the instant-on boot has not occurred.

4. The method of claim 1, wherein the IHS further comprises a thermal sensor and a fan associated with the at least one additional GPU, the thermal sensor and the fan being disabled if the instant-on boot occurred.

5. The method of claim 1, wherein the instant-on boot utilizes a simplified operating system (OS) and only loads a set of device drivers that are need for a multimedia mode in the IHS.

6. The method of claim 1, wherein a clock rate of the first GPU is increased when the at least one additional GPU is disabled.

7. An information handling system (IHS) comprising:
    a first graphics processing unit (GPU) and at least one additional GPU, wherein the at least one additional GPU is coupled to the first GPU by a switch, and the first GPU and the at least one additional GPU are coupled to a graphic connector through a bridge;
    a memory operable to store firmware, wherein the firmware detects whether a power-on occurs in the IHS; and
    a controller coupled to the memory, wherein the controller is configured to disable the at least one additional GPU in the event the power-on occurs and an instant-on boot occurs;
    wherein the switch coupling the first GPU to the at least one additional GPU is powered down when the at least one additional GPU is disabled.

8. The system of claim 7, wherein the controller restores the at least one additional GPU to a pre-determined state if a normal boot does not occur, wherein the pre-determined state is a state of the first GPU and the at least one additional GPU saved prior to the power-on.

9. The system of claim 7, wherein the first GPU and the at least one additional GPU are enabled if a normal boot occurs and the instant-on boot does not occur.

10. The system of claim 7 further comprising:
    at least one thermal sensor coupled to the at least one additional GPU, wherein the at lease one thermal sensor is disabled when the at least one additional GPU is disabled; and
    a fan for cooling the at least one additional GPU, wherein the fan is disabled when the at least one additional GPU is disabled.

11. The system of claim 7, wherein the instant-on boot utilizes a simplified operating system (OS) and only loads a set of device drivers that are need for a multimedia mode in the IHS.

12. The system of claim 7, wherein a clock rate of the first GPU is increased when the at least one additional GPU is disabled.

13. A non-transitory computer-readable medium having computer-executable instructions for reducing power consumption in an information handling system (IHS), the method comprising:
    detecting a power-on in the IHS, wherein the IHS comprises a first graphics processing unit (GPU) and at least one additional GPU;
    determining if a normal boot is implemented in the IHS;
    determining if an instant-on boot occurred; and
    disabling the at least one additional GPU if an instant-on boot occurred;
    wherein the IHS further comprises a switch coupling the first GPU to the at least one additional GPU, the switch being powered down if the instant-on boot occurred.

14. The computer-readable medium of claim 13, wherein the IHS restores the at least one additional GPU to a pre-determined state if the normal boot is not implemented, wherein the pre-determined state is a state of the first GPU and the at least one additional GPU saved prior to the power-on.

15. The computer-readable medium of claim 13, wherein the first GPU and the at least one additional GPU are enabled if the normal boot is implemented and the instant-on boot has not occurred.

16. The computer-readable medium of claim 13, wherein the IHS further comprises a thermal sensor and a fan associated with the at least one additional GPU, the thermal sensor and the fan being disabled if the instant-on boot occurred.

17. The computer-readable medium of claim 13, wherein the instant-on boot utilizes a simplified operating system (OS) and only loads a set of device drivers that are need for a multimedia mode in the IHS.

* * * * *